(12) United States Patent
Martin et al.

(10) Patent No.: US 8,566,279 B1
(45) Date of Patent: Oct. 22, 2013

(54) ENHANCED DATA COLLECTION TECHNIQUES

(75) Inventors: Justin A. Martin, Olathe, KS (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 42 days.

(21) Appl. No.: 13/348,437

(22) Filed: Jan. 11, 2012

Related U.S. Application Data

(63) Continuation-in-part of application No. 12/938,207, filed on Nov. 2, 2010, now Pat. No. 8,370,397.

(51) Int. Cl.
*G06F 17/30* (2006.01)

(52) U.S. Cl.
USPC .......................................... 707/625; 707/770

(58) Field of Classification Search
USPC ......... 707/610, 624, 625, 802, 812, 831, 609, 707/764, 770, 803, 805, 807, 809
See application file for complete search history.

(56) References Cited

U.S. PATENT DOCUMENTS

| 8,370,397 B1 | 2/2013 | Martin et al. |
| 2002/0099753 A1 | 7/2002 | Hardin et al. |
| 2003/0055835 A1 * | 3/2003 | Roth ............................. 707/102 |
| 2004/0044665 A1 | 3/2004 | Nwabueze |
| 2010/0122175 A1 * | 5/2010 | Gupta et al. ................. 715/735 |

OTHER PUBLICATIONS

Pre-Interview Communication dated Apr. 11, 2012, U.S. Appl. No. 12/938,207 filed on Nov. 2, 2010.
Notice of Allowance dated Sep. 21, 2012, U.S. Appl. No. 12/938,207, filed Nov. 2, 2010.
First Action Interview Office Action dated Jun. 11, 2012, U.S. Appl. No. 12/938,207, filed Nov. 2, 2010.

* cited by examiner

*Primary Examiner* — Greta Robinson (57) ABSTRACT

A data collection system is provided. The system comprises a central server that stores configuration data, a plurality of data sources that produce data, and a plurality of collectors. Each of the plurality of collectors is stored in a computer readable storage medium and executable by a processor to obtain corresponding configuration data from the central server, compare the obtained configuration data to configuration data stored in memory of a corresponding server, replace at least a portion of the configuration data stored in memory with at least a portion of the obtained configuration data when the obtained configuration data is different than the configuration data stored in memory, and collect data from one of the plurality of data sources based on at least the at least a portion of the obtained configuration data when the obtained configuration data is different than the configuration data stored in memory.

18 Claims, 6 Drawing Sheets

ENHANCED DATA COLLECTION TECHNIQUES

CROSS-REFERENCE TO RELATED APPLICATIONS

This application is a continuation-in-part of and claims priority to U.S. patent application Ser. No. 12/938,207, filed Nov. 2, 2010, entitled "Enhanced Data Collection Techniques", by Justin A. Martin, et al., which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises today may maintain server farms to process enterprise data. A server farm is a collection of servers. For example, a server farm may comprise hundreds or even thousands of servers. Enterprises may collect data from each of the servers in the server farm. For example, an enterprise may collect application data from applications executing on the servers. The enterprise may store this data in a database to enable access to the data at a later time. For instance, a billing application and a marketing application may be executing on one or more servers in the server farm. An enterprise may collect data from the billing application and the marketing application and store the data in a database. Collecting and storing such data may enable the billing department and the marketing department to perform analysis on their respective data.

SUMMARY

In an embodiment, a data collection system is disclosed. The system comprises a central server that stores configuration data, a plurality of data sources that produce data, and a plurality of collectors. Each of the plurality of collectors is stored in a computer readable storage medium and executable by a processor to obtain corresponding configuration data from the central server, compare the obtained configuration data to configuration data stored in memory of a corresponding server, replace at least a portion of the configuration data stored in memory with at least a portion of the obtained configuration data when the obtained configuration data is different than the configuration data stored in memory, and collect data from one of the plurality of data sources based on at least the at least a portion of the obtained configuration data when the obtained configuration data is different than the configuration data stored in memory.

In an embodiment, a data collection system is disclosed. The system comprises a plurality of data sources that produce data. The system also comprises a plurality of collectors. Each of the plurality of collectors is stored in a computer readable storage medium and executable by a processor to obtain corresponding configuration data from a central server, compare the obtained configuration data to configuration data stored in memory of a corresponding server, replace the configuration data stored in memory with the obtained configuration data when the obtained configuration data is different than the configuration data stored in memory, and collect data from the one of the plurality of data sources based on the obtained configuration data when the obtained configuration data is different than the configuration data stored in memory. The system further comprises a plurality of listeners stored in a computer readable storage medium and executable by a processor to receive the collected data from the plurality of data sources, identify the collected data, parse the collected data, convert the collected data into a generic format, and validate the converted data. The system further comprises a loader stored in a computer readable storage medium and executable by a processor to load the converted data into a database.

In an embodiment, a method for collecting data is disclosed. The method comprises changing configuration data stored on a central server. The method also comprises obtaining, by a collector stored on a computer readable storage medium and executed by a processor, corresponding configuration data that includes the change to the configuration data from the central server. The method further comprises implementing, by the collector, at least the change to the configuration data and collecting, by the collector, data from a data source based on at least the change to the configuration data.

In an embodiment, a data collection system is disclosed. The system comprises a plurality of data sources that produce data. At least some of the plurality of data sources produce data in different formats. The system also comprises a plurality of listeners stored in a computer readable storage medium that, when executed by a processor, receive the data from the plurality of data sources, identify the data, parse the data, convert the data into a generic format, and validate the converted data. The plurality of listeners are implemented using a script programming language. The system further comprises a loader stored in a computer readable storage medium that, when executed by a processor, loads the converted data into a database. The loader is implemented using an object oriented programming language.

In an embodiment, a computer-implemented method for collecting data is disclosed. The method comprises receiving, by a plurality of listeners implemented using a script programming language, stored on computer-readable medium, and executed by a processor, data from a plurality of data sources. The data comprises different formats. The method also comprises converting, by the plurality of listeners, the data into extensible markup language data sets and validating, by the plurality of listeners, the extensible markup language data sets. The method further comprises loading, by a loader implemented using an object oriented programming language, stored on a computer-readable medium, and executed by a processor, the extensible markup language data sets into a database.

In an embodiment, a data collection system is disclosed. The system comprises a plurality of data sources that produce data. At least some of the plurality of data sources produce data in different formats. The system also comprises a plurality of files. Each of the plurality of files is associated with a different size file line. The system further comprises a plurality of listeners stored in a computer readable storage medium that, when executed by a processor, receive the data from the plurality of data sources, identify the data, parse the data, convert the data into extensible markup language data sets, validate the extensible markup language data sets, and write the extensible markup language data sets to the plurality of files. The system additionally comprises a plurality of loaders stored in a computer readable storage medium that, when executed by a processor, load the extensible markup language data sets into a database. Each of the plurality of loaders loads file lines of a certain size from one of the plurality of files. The system further comprises a plurality of JAVA virtual machines. Each of the plurality of JAVA virtual machines is tuned differently and each of the plurality of loaders operates in a different one of the plurality of JAVA virtual machines.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Collecting data from server farms that comprise hundreds or thousands of servers may present a large processing load. In order to collect data from these server farms, agents or data collectors may be installed on each of the servers. Previously, each agent may have been configured locally by an administrator. Thus, if configuration data for any of the agents changed, each agent may have to be individually and locally reconfigured. For example, if a new version of an application was installed on 50 servers, a new directory structure would likely result, which would likely change the location of log files from which the agents on the 50 servers were supposed to be collecting data. Previously, an administrator may have touched all 50 servers and individually reconfigured each of the agents locally to reflect the change. Such a process was cumbersome and time consuming.

Accordingly, the pending application is directed to a quicker and more efficient data collection system and method. Specifically, instead of each agent having to be initially particularly configured locally and then reconfigured locally if a change occurred, the pending application discloses a plurality of generic data collectors that are each managed remotely from a central server after initial installation. The plurality of data collectors may be considered "generic" because the plurality of data collectors may be installed without particular configurations and may retrieve particular configuration data from a central server. For example, configuration data may be stored on a central server and each of the data collectors may communicate with the central server periodically to obtain corresponding configuration data. Therefore, continuing with the above example, instead of having to update configuration data for each of the data collectors locally at each of the 50 servers, configuration data would only need to be updated at the central server thereby saving time and resources and enabling faster and easier deployment and management of the data collectors.

Figure 1:
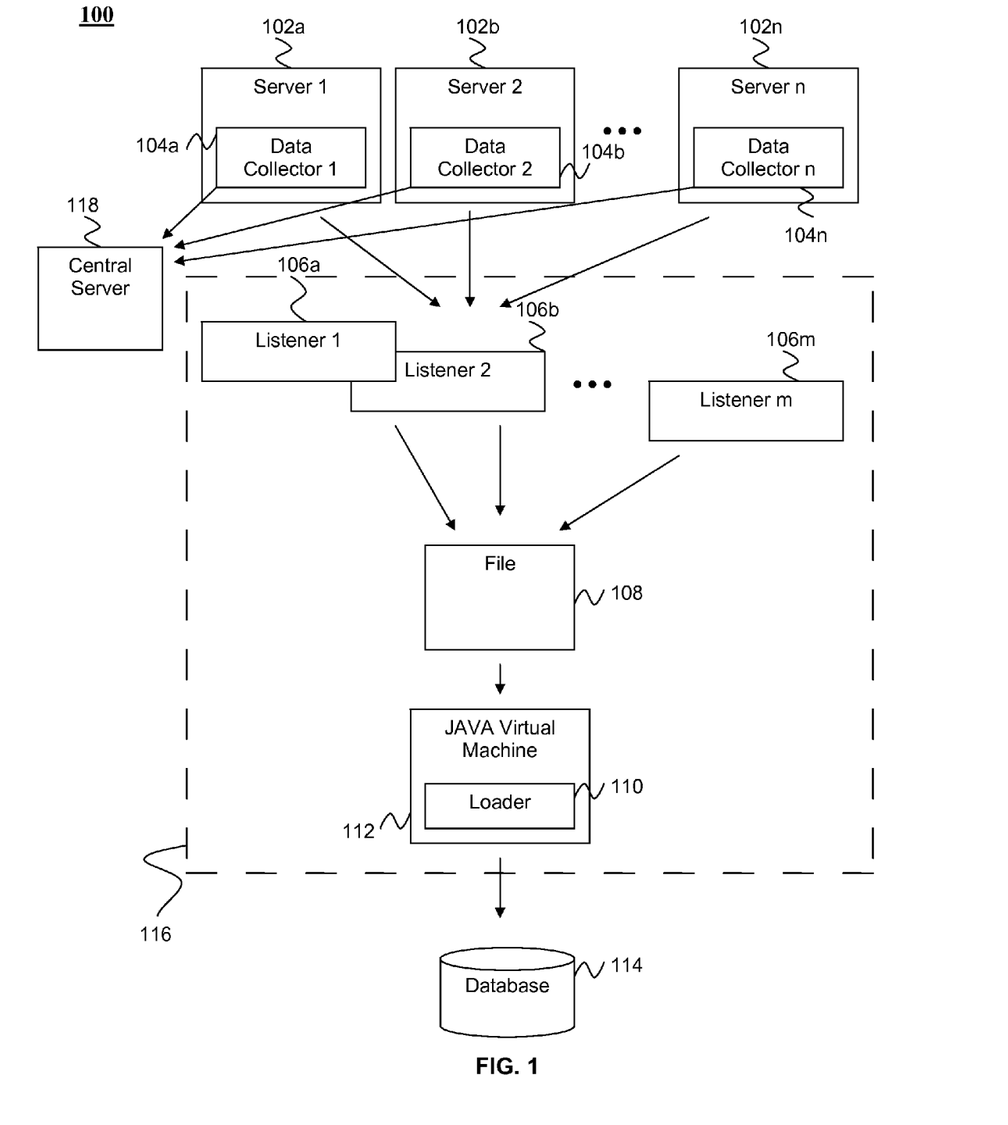
FIG. 1 is a block diagram of a data collection system according to an embodiment of the disclosure.

Turning now to FIG. 1, a data collection system 100 is described. In an embodiment, the system 100 comprises a plurality of servers 102a-102n, a plurality of data collectors 104a-104n, a plurality of listeners 106a-106m, a file 108, a loader 110, a JAVA virtual machine 112, a database 114, and a central server 118. In some contexts herein, the plurality of servers 102a-102n, the plurality of data collectors 104a-104n, and the plurality of listeners 106a-106m may be referred to as the servers 102, the data collectors 104, and the listeners 106, respectively.

In an embodiment, each of the servers 102 may comprise one of the data collectors 104. For example, server 1 102a may comprise data collector 1 104a, server 2 102b may comprise data collector 2 104b, and server n 102n may comprise data collector n 104n. Each of the data collectors 104 may collect data from one of the servers 102 based on configuration data obtained from the central server 118.

The central server 118 may be a computer system, which is described in greater detail hereinafter. In an embodiment, the central server 118 stores configuration data for each of the data collectors 104 such that each of the data collectors 104 can communicate with the central server 118 and obtain corresponding configuration data from the central server 118. The configuration data obtained from the central server 118 may indicate to the data collectors 104 how to collect data, where to collect data, what to collect data from, how to process collected data, what data to collect, where to send the collected data, how often to send the collected data, how to package the collected data, and other things.

In a preferred embodiment, each of the data collectors 104 pulls the corresponding configuration data from the central server 118 for security reasons. However, in alternative embodiments, the central server 118 could push the corresponding configuration data to each of the data collectors 104.

In an embodiment, each of the data collectors 104 communicates with the central server 118 periodically to obtain configuration data. For example, each of the data collectors 104 may contact the central server 118 daily. To reduce the load on the central server 118, some of the data collectors 104 may call into or otherwise communicate with the central server 118 at different times. Also, to reduce the load on the central server 118, the data collectors 104 may communicate with the central server 118 during off-peak hours. For example, the data collectors 104 may communicate with the central server 118 on weekends, holidays, daily from 12 am to 4 am, or at another off-peak time.

In an embodiment, each of the data collectors 104 contacts the central server 118 daily at a time based on their original installation time. For example, if data collector 104a is originally installed at 12:01 pm, data collector 104a may contact the central server 118 daily at 12:01 pm to obtain configuration data. In another embodiment, each of the data collectors 104 may contact the central server 118 daily at a time based on their original installation time plus an offset. For example, if data collector 104a is originally installed at 12:01 pm and an offset of 12 hours is selected, data collector 104a may contact the central server 118 daily at 12:01 am to obtain configuration data. Such embodiments promote a distribution of processing load.

In addition to or in lieu of communicating with the central server 118 periodically to obtain configuration data, the data collectors 104 may communicate with the central server 104 on an aperiodic basis. For example, a command or a message may be sent out to each of the data collectors 104 from the central server 118 requesting the data collectors to contact the central server 118 and conduct an aperiodic configuration operation.

Each of the data collectors 104 may compare the obtained configuration data from the central server 118 to configuration data stored in memory of the corresponding server 102 to determine if there is a difference. One of ordinary skill in the art will appreciate that a change to the configuration data may be determined in a number of different ways. For example, the data collectors 104 may determine that the obtained data is different than the configuration data stored in memory of the corresponding server 102 based on a date associated with the obtained data.

In an embodiment, if for one of the data collectors 104 the obtained configuration data is different than the configuration data stored in memory of the corresponding server 102, that data collector 104 replaces at least a portion of the configuration data stored in memory of the corresponding server 102 with at least a portion of the obtained configuration data. For example, if data collector 104a determines that the configuration data it obtained from the central server 118 is different than the configuration data stored in the memory of server 102a, data collector 104a may replace at least a portion of the configuration data stored in the memory of server 102a with at least a portion of the obtained configuration data. For instance, continuing with the above example, data collector 104a may replace just the changed portion of the configuration data stored in the memory of server 102a. Alternatively, data collector 104a may replace all of the configuration data stored in the memory of server 102a with all of the obtained configuration data. In an embodiment, the data collectors 104 may report the replacement back to the central server 118.

As described above, each of the data collectors 104 may perform the comparison between the obtained configuration data and configuration data stored in memory of the corresponding server 102 and may make the determination as to whether or not the obtained configuration data is different than or identical to the configuration data stored in memory. However, in alternative embodiments, the central server 118 may perform the comparison and/or the determination. For example, each of the data collectors 104 may send the central server 118 its configuration data stored in memory of the corresponding server 102, and the central server 118 may compare the received configuration data with the configuration data the central server 118 has corresponding to the particular data collector 104 and determine whether or not the received configuration data is different than or identical to the configuration data stored at the central server 118.

In an embodiment, when the obtained configuration data is different than the configuration data stored in memory of the corresponding server 102, the data collectors 104 collect data from data sources such as servers 102 based on at least a portion of the obtained configuration data. For example, if the data collectors 104 replace just the changed portion of the configuration data stored in memory of the corresponding server 102, the data collectors 104 may collect data based on the unchanged portion of the configuration data which is maintained in the memory and the changed portion of the configuration data (i.e., at least a portion of the obtained configuration data). Alternatively, if the data collectors 104 replace the configuration data stored in memory of the corresponding server 102 in its entirety with the obtained configuration data, the data collectors 104 may collect data based on all of the obtained configuration data.

In an embodiment, if for one of the data collectors 104 the obtained configuration data is identical to the configuration data stored in memory of the corresponding server 102, that data collector 104 maintains the configuration data stored in the memory. For example, if data collector 104a determines that the configuration data it obtained from the central server 118 is identical to the configuration data stored in the memory of server 102a, data collector 104a may maintain the configuration data stored in the memory of server 102a. In an embodiment, when the obtained configuration data is identical to the configuration data stored in memory of the corresponding server 102, the data collectors 104 collect data based on the configuration data stored in the memory.

In an embodiment, the data collectors 104 collect application data and/or application performance information from the one or more applications executing on the servers 102. The data collectors 104 also may collect server performance information including CPU and memory utilization information as well as configuration information. In an embodiment, the data collectors 104 collect system metrics that comprise one or more of disk statistics, adapter statistics, global statistics, and network statistics.

The data collectors 104 may collect data that is in a plurality of different formats. For example, the collected data may be in extensible markup language (XML) format, common-separated values (CSV) format, Nigel's Monitor (Nmon) format, and/or some other data format. In an embodiment, the data collectors 104 push the collected data to the listeners 106. The data collectors 104 may push the collected data to the listeners 106 periodically.

The data collectors 104 may be implemented using a script programming language. For example, in a preferred embodiment, the data collectors 104 are implemented using Perl. In other embodiments, the data collectors 104 may be implemented using PHP or another script programming language. Alternatively, the data collectors 104 may be implemented using an object oriented programming language such as JAVA. Those skilled in the art will appreciate that there may be other suitable script programming languages or object oriented programming languages that may be employed to implement the data collectors 104.

The listeners 106 may receive the data from the data collectors 104. There may be a one-to-many relationship between each of the listeners 106 and the servers 102. For example, each of the listeners 106 may receive data from a plurality of servers. In an embodiment, after receiving the data, the listeners 106 identify the data, parse the data, convert the data into a generic format, and validate the converted data. The listeners 106 may convert the data into a generic format such as XML or some other type of generic format. In an embodiment, when the listeners 106 receive data that is already in the generic format, the listeners 106 do not parse the data or convert the data. However, the listeners 106 may still validate the data so that any errors may be identified and corrected.

The listeners 106 may be implemented using a script programming language. For example, in a preferred embodiment, the listeners 106 are implemented using Perl. In an alternate embodiment, the listeners 106 are implemented using PHP or another script programming language. Those who are skilled in the art will appreciate that there may be other suitable script programming languages that may be employed.

When the listeners 106 are finished processing the collected data, the listeners 106 may write the collected data to the file 108. In an embodiment, the file 108 is stored in a data store. For example, the file 108 may be stored on a disk or in memory such as random access memory (RAM). While only a single file 108 is illustrated in FIG. 1, a plurality of files may exist. For instance, a new file may be created after file 108 reaches a particular file size or after a predetermined amount of time has elapsed. Additionally, files may be deleted. For example, a file may be deleted after a predetermined amount of time. In combination with the present disclosure, one skilled in the art would appreciate that this kind of housekeeping of the file or files 108 may be employed. Hereinafter the file 108 and other files may be referred to as a single file, but it is expressly understood that the reference to a single file may imply a family of related files. For example files each having a related name such as a first file named CPU_Utilization 2010_09_23_13:07:00_to_2010_09_23_13:10:43 and a second file named CPU_Utilization 2010_09_23_13: 10:43_to_2010_09_23_13:17:07 may be referred to in the singular as the CPU Utilization file.

The loader 110 may retrieve the data from the file 108 and load the data into the database 114. In an embodiment, the loader 110 retrieves the data from the file 108 periodically. While only a single database 114 is illustrated in FIG. 1, the loader 110 may load the data into a plurality of databases.

The loader 110 may be implemented using an object oriented programming language. For example, in a preferred embodiment, the loader 110 is implemented using JAVA. In an alternate embodiment, the loader 110 is implemented using another object oriented language. The loader 110 may operate in the JAVA virtual machine 112.

Implementing the listeners 106 using a script programming language and the loader 110 using an object oriented programming language has been found to increase processing speed. For example, an approximate ten fold increase in processing speed may result. The listeners 106, the file 108, the loader 110, and the JAVA virtual machine 112 may be stored and/or executed on a computer system 116. Computer systems are discussed in more detail hereinafter.

Figure 2:
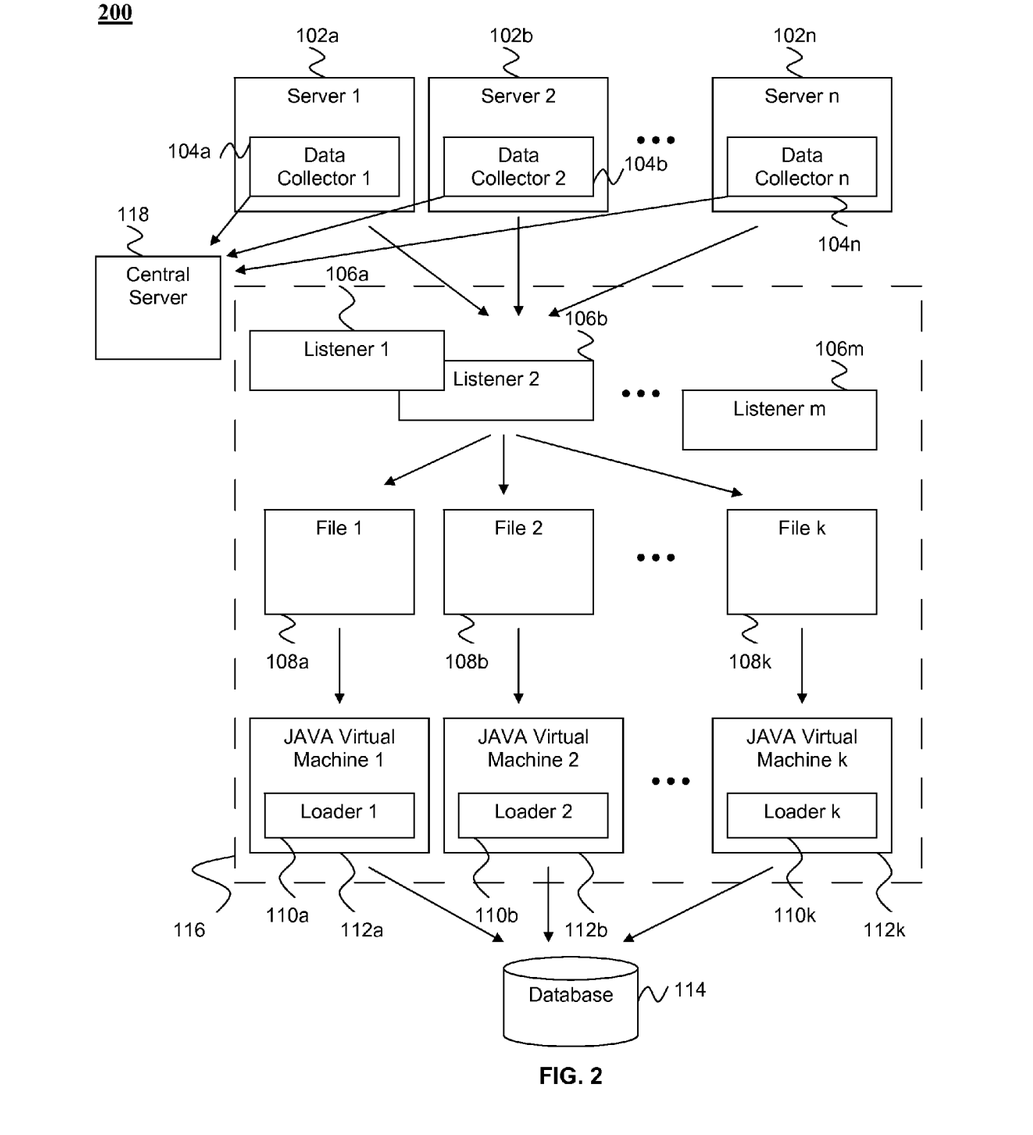
FIG. 2 is a block diagram of a data collection system according to an embodiment of the disclosure.

Turning now to FIG. 2, a data collection system 200 is described. The data collection system of FIG. 2 is similar to the data collection system of FIG. 1 except that the data collection system of FIG. 2 comprises a plurality of files 108a-108k, a plurality of loaders 110a-110k, and a plurality of JAVA virtual machines 112a-112k rather than a single file 108, a single loader 110, and a single JAVA virtual machine 112. Because the plurality of servers 102a-102n, the plurality of data collectors 104a-104n, the plurality of listeners 106a-106m, and the central server 118 are substantially similar to those discussed above in regard to FIG. 1, only the plurality of files 108a-108k, the plurality of loaders 110a-110k, and the plurality of JAVA virtual machines 112a-112k will be addressed below. In some contexts herein, the plurality of files 108a-108k, the plurality of loaders 110a-110k, and the plurality of JAVA virtual machines 112a-112k may be referred to as the files 108, the loaders 110, and the JAVA virtual machines 112, respectively.

When the listeners 106 are finished processing the collected data, the listeners 106 may write the collected data to the files 108. In an embodiment, the listeners 106 write the data to one of files 108 based on the line size of the data. In some contexts, lines may be referred to as file lines. For example, each of the files 108 may store data with a different particular line size or a particular range of line sizes and/or a different type of data. Stated another way, each of the files 108 may store data associated with a different size file line. In an embodiment, the files 108 are stored in one or more data stores. For example, the files 108 may be stored on one or more disks or in one or more memory components.

The loaders 110 may retrieve the data from the files 108 and load the data into the database 114. In an embodiment, each of the loaders 110 retrieves the data from a different one of the files 108. Stated another way, there may be a one-to-one relationship between each of the loaders 110 and each of the files 108. For example, loader 1 110a may retrieve data from file 1 108a, loader 2 110b may retrieve data from file 2 108b, and loader k 110k may retrieve data file n 108k. In an embodiment, each of the loaders 110 retrieves data from a corresponding one of the files 108 periodically. As disclosed above, each of the files 108 may store data of a particular line size or a particular range of line sizes and/or particular data type. For example, the first file 108a may store data of a first line size or a first range of line sizes and/or a first data type and the second file 108b may store data of a second line size or a second range of line sizes and/or a second data type, where the line size or range of line sizes or data type are different between the first file 108a and the second file 108b. Thus, each of the loaders 110 may process data of a particular line size or a particular range of line sizes and/or a particular data type depending upon which of the files 108 the loaders 110 retrieve their data from. While only a single database 114 is illustrated in FIG. 2, the loaders 110 may load the data into a plurality of databases.

The loaders 110 may be implemented using an object oriented programming language. For example, in a preferred embodiment, the loaders 110 are implemented using JAVA. In an alternate embodiment, the loaders 110 are implemented using another object oriented language. Each of the loaders 110 may operate in a different one of the JAVA virtual machines 112.

Each one of the JAVA virtual machines 112 may be independently optimized for the particular line size or the particular range of line sizes and/or the data type associated with the data being loaded there through. For example, JAVA Virtual Machine 1 112a may be optimized for processing data with the particular line size or the particular range of line sizes and/or the particular data type associated with file 1 108a, JAVA Virtual Machine 2 112b may be optimized for processing data with the particular line size or the particular range of line sizes and/or the particular data type associated with file 2 108b, and JAVA Virtual Machine k 112k may be optimized for processing data with the particular line size or the particular range of line sizes and/or particular data type associated with file k 108k.

Optimizing each of the JAVA virtual machines 112 independently may comprise tuning each of the JAVA virtual machines 112 differently. In an embodiment, optimizing each of the JAVA virtual machines 112 may comprise varying the heap memory size, the number of threads, and/or the number of data connections for each of the JAVA virtual machines 112. For example, one or more of the heap size, the number of threads, and/or the number of data connections may be different for each of the JAVA virtual machines 112.

In an embodiment, the heap size of each of the JAVA virtual machines 112 is adjusted differently for the particular line size or the particular range of line sizes and/or the particular data type of the data that each of the JAVA virtual machines 112 will be processing. For example, the heap size may be made smaller for the JAVA virtual machines 112 that are processing data with smaller line sizes and larger for the JAVA virtual machines 112 that are processing data with larger line sizes. Each of the JAVA virtual machines 112 may have a different size heap. Adjusting the heap size of each of the JAVA virtual machines 112 differently depending on the particular line size or the particular range of line sizes and/or the particular data type of each of the JAVA virtual machines 112 may increase efficiency.

In an embodiment, the heap size for each of the JAVA virtual machines 112 may be adjusted to a particular size based on the particular line size or the particular line size range associated with the data being processed by each of the JAVA virtual machines 112 such that each of the JAVA virtual machines 112 processes the data in the new generation portion of heap memory. Adjusting the heap size for each of JAVA virtual machines 112 in this way may prevent data from overflowing and being processed in the old generation portion of heap memory. Sizing the heap of each of the JAVA virtual machines 112 such that each of the JAVA virtual machines 112 processes their respective data in the new generation portion of heap memory rather than in the old generation portion of heap memory may reduce processing time.

The number of threads each of the JAVA virtual machines 112 have also may be varied depending upon the particular line size or the particular range of line sizes and/or the particular data type associated with the data each of the JAVA virtual machines 112 are processing. For example, JAVA virtual machines 112 processing data with smaller line sizes may have a larger number of threads while JAVA virtual machines 112 processing data with larger line sizes may have a smaller number of threads. Each of the JAVA virtual machines 112 may have a different number of threads.

The number of data connections each of the JAVA virtual machines 112 have also may be varied depending upon the particular line size or the particular range of line sizes and/or the particular data type associated with the data each of the JAVA virtual machines 112 are processing. For instance, JAVA virtual machines 112 processing data with smaller line sizes may have a smaller number of data connections while JAVA virtual machines 112 processing data with larger line sizes may have a larger number of data connections. Each of the JAVA virtual machines 112 may have a different number of data connections.

Changing one or more of the above identified parameters for each of the JAVA virtual machines 112 such that each of the JAVA virtual machines 112 is optimized independently for the particular line size or the particular range of line sizes and/or the particular data type associated with the data it will be processing may result in each of the JAVA virtual machines 112 being unique or different. Such an embodiment is in contrast to how JAVA virtual machines have been used in the past. Previously, if a number of JAVA virtual machines were to be used, each of the JAVA virtual machines would be identical to one another. For example, in an enterprise where one or more applications may execute distributed across a plurality of equivalent servers, each server executing one or more JAVA virtual machines, it is customary to configure each of the JAVA virtual machines identically. Optimizing the JAVA virtual machines 112 so that each of the JAVA virtual machines is unique to the particular line size or the particular range of line sizes associated with the data it will be processing may cause an additional two and a half times increase in processing a fixed amount of data beyond the approximate ten fold increase that may result from implementing the listeners 106 using a script programming language and the loader 110 using an object oriented programming language. The listeners 106, the files 108, and the loaders 110 may be stored and/or executed on a computer system 116. Computer systems are discussed in more detail hereinafter.

Figure 3:
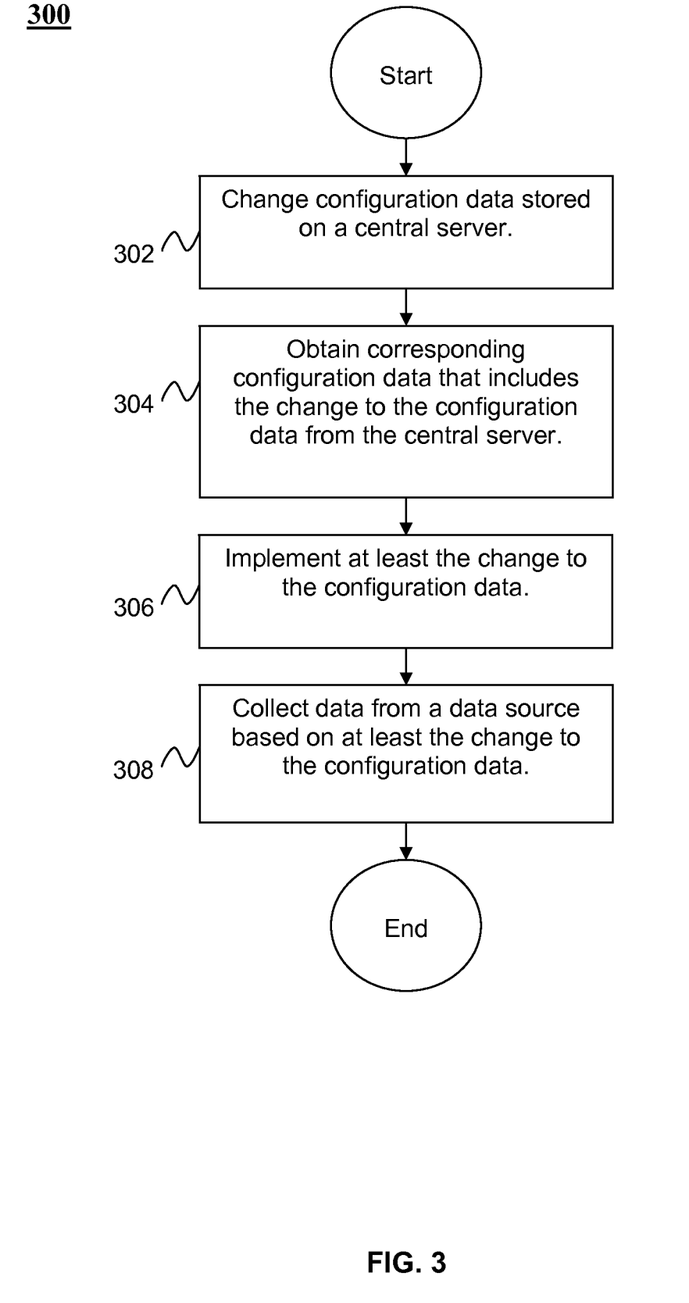
FIG. 3 is a flow chart of a method for collecting data according to an embodiment of the disclosure.

Turning now to FIG. 3, a method 300 for collecting data is described. At block 302, configuration data stored on the central server 118 is changed. For example, an administrator may change configuration data on the central server 118 for one or more of the data collectors 104. For instance, if a new version of an application is installed on one or more of the servers 102, a new directory structure may result, which may change the location of log files from which the data collectors 104 on the one or more of the servers 102 is supposed to be collecting data. In an embodiment, instead of having to implement the change to configuration data locally at each of the one or more servers as had to be previously done, the administrator simply changes the configuration data at the central server 118 thereby saving time and resources.

At block 304, each of a plurality of data collectors 104a-104n obtains corresponding configuration data from the central server 118. In an embodiment, the obtained configuration data includes the change implemented by the administrator in block 302.

At block 306, each of the data collectors 104 implements the change to the configuration data. For example, each of the data collectors 104 may implement the change to the configuration data obtained from the central server 118 by replacing at least a portion of configuration data stored in memory of the corresponding server 102 with at least a portion of the obtained configuration data. At block 308, each of the data collectors 104 collects data from a data source such as one of the servers 102 based on at least the change to the configuration data obtained from the central server 118.

Figure 4:
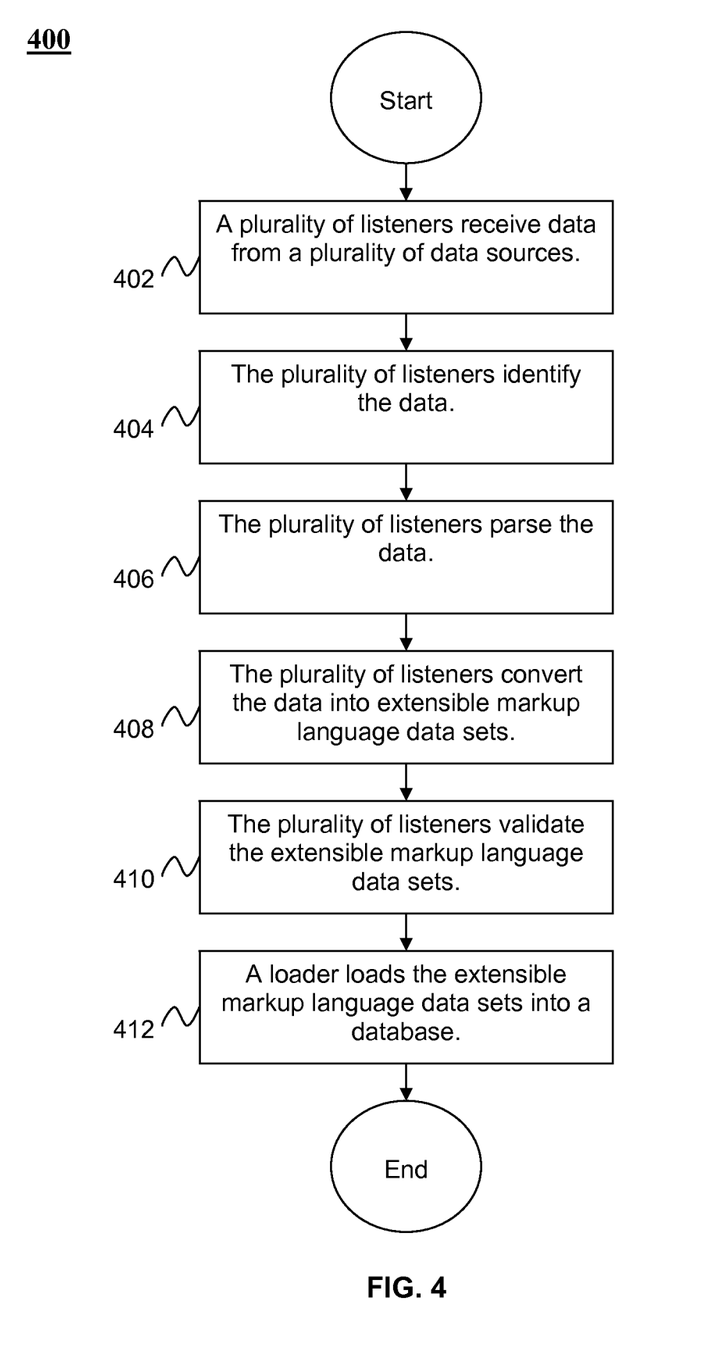
FIG. 4 is a flow chart of a method for collecting data according to an embodiment of the disclosure.

Turning now to FIG. 4, a method 400 for collecting data is described. At block 402, a plurality of listeners 106a-106m receive data from a plurality of data sources. For example, the listeners 106 may receive data from one or more of the plurality of servers 102a-102n. Specifically, the listeners 106 may receive data from one or more of the plurality of data collectors 104a-104n. In an embodiment, the data from the plurality of data sources comprises different formats. For example, the data may be in XML, CSV, Nmon, or some other type of data format.

At block 404, the listeners 106 identify the data. At block 406, the listeners 106 parse the data. At block 408, the listeners 106 convert the data into XML data sets. If some of the data is already in XML then blocks 406 and 408 may not be performed on that particular data. At block 410, the listeners 106 validate the XML data sets. The listeners 106 may be implemented using a script programming language such as Perl.

At block 412, a loader 110 loads the XML data sets into a database. For example, the loader 110 may retrieve the XML data sets from a file 108 and load them into the database 114. The loader 110 may be implemented using an object oriented programming language such as JAVA and operated in a JAVA virtual machine 112.

Figure 5:
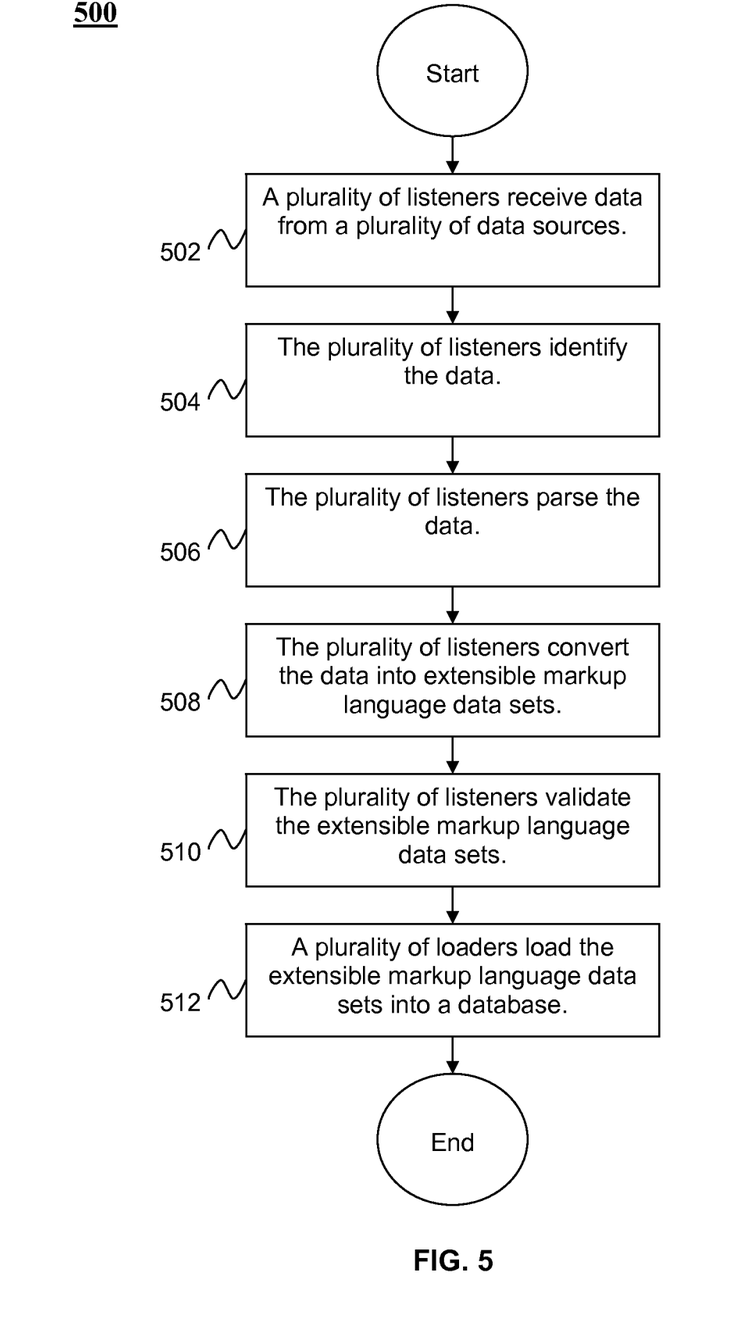
FIG. 5 is a flow chart of a method for collecting data according to an embodiment of the disclosure.

Turning now to FIG. 5, a method 500 for collecting data is described. The method of FIG. 5 is similar to the method of FIG. 4. Specifically, blocks 402-410 of FIG. 4 are substantially similar to blocks 502-510 of FIG. 5. Accordingly, only block 512 will be addressed below.

At block 512, a plurality of loaders 110a-110k load the XML data sets into a database. For example, each of the loaders 110 may retrieve the XML data sets from a different one of the plurality of files 108a-108k and load them into the database 114. Each of the files 108 may store data with a particular line size or a particular range of line sizes. Thus, each of the loaders 110 may load data of a particular line size or a particular range of line sizes and/or a particular data type. In an embodiment, each of the loaders 110 is implemented using an object oriented programming language such as JAVA and operated in a different one of a plurality of JAVA virtual machine 112a-112k. Each of the JAVA virtual machines 112 may be optimized independently of each other for the particular line size or the particular range of line sizes and/or the particular data type associated with the data being loaded there through. In an embodiment, optimizing each of the JAVA virtual machines 112 may comprise varying one or more of the heap memory size, the number of threads, and/or the number of data connections differently for each of the JAVA virtual machines 112. For example, one or more of the heap memory size, the number of threads, and/or the number of data connections may be different for each of the JAVA virtual machines 112.

Figure 6:
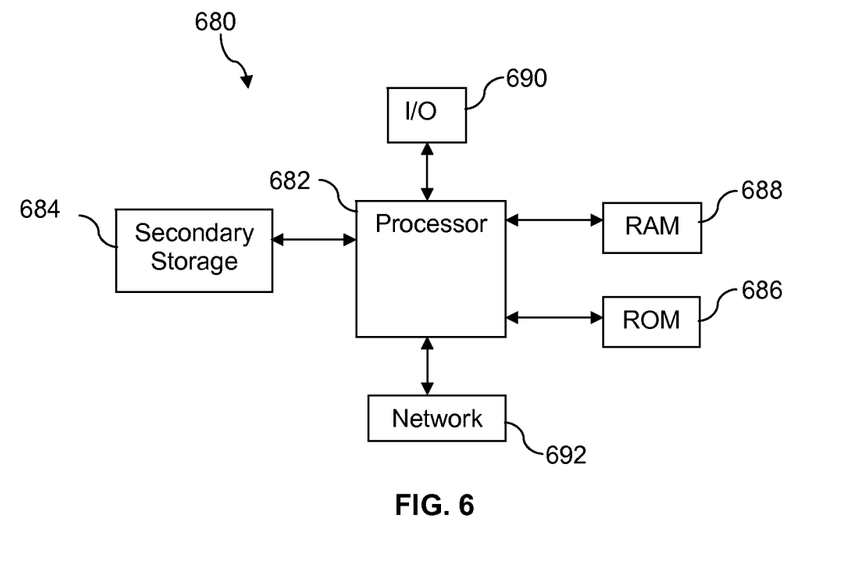
FIG. 6 illustrates an exemplary computer system suitable for implementing the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as non-transitory storage and/or non-transitory computer readable media.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with the Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data collection system, comprising:
  a central server that stores configuration data;
  a plurality of data sources that produce data;
  a plurality of collectors, each of the plurality of collectors stored in a computer readable storage medium and executable by a processor to:
    obtain corresponding configuration data from the central server;
    compare the obtained configuration data to configuration data stored in a memory of a corresponding server;
    determine that the obtained configuration data is different from the configuration data stored in the memory of the corresponding server based on the comparison;
    replace at least a portion of the configuration data stored in the memory with at least a portion of the obtained configuration data in response to determining that the obtained configuration data is different than the configuration data stored in the memory; and
    collect data from one of the plurality of data sources based on at least the at least a portion of the obtained configuration data when the obtained configuration data is different than the configuration data stored in the memory;
  a plurality of listeners stored in a computer readable storage medium and executable by a processor to receive the collected data from the plurality of collectors, wherein the plurality of listeners are implemented using a script programming language, and wherein the script programming language is Perl; and
  a loader stored in a computer readable storage medium and executable by a processor to load the collected data into a database, wherein the loader is implemented using an object oriented programming language.

2. The data collection system of claim 1, wherein each of the collectors is further executable to:
  maintain the configuration data stored in the memory when the obtained configuration data is identical to the configuration data stored in memory; and
  collect data from the one of the plurality of data sources based on the configuration data stored in the memory when the obtained configuration data is identical to the configuration data stored in the memory.

3. The data collection system of claim 1, wherein each of the plurality of collectors is further executable to communicate with the central server to obtain configuration data.

4. The data collection system of claim 3, wherein some of the plurality of collectors communicate with the central server at different times.

5. The data collection system of claim 3, wherein each of the plurality of collectors communicates with the central server on a periodic basis or on an aperiodic basis.

6. The data collection system of claim 5, wherein the periodic basis is daily based on an initial installation time of each of the plurality of collectors.

7. The data collection system of claim 1, wherein the plurality of collectors are implemented using a script programming language.

8. The data collection system of claim 1, wherein the at least a portion of the configuration data stored in the memory that is replaced with the at least a portion of the obtained data is a changed configuration data.

9. The data collection system of claim 1, wherein each of the plurality of collectors is executable to replace all of the configuration data stored in the memory with all of the obtained data when the configuration data stored in the memory is different than the obtained configuration data.

10. The data collection system of claim 1, wherein each of the plurality of collectors is further executable to report the replacement back to the central server.

11. A data collection system, comprising:
a plurality of data sources that produce data;
a plurality of collectors, each of the plurality of collectors stored in a computer readable storage medium and executable by a processor to:
obtain corresponding configuration data from a central server,
compare the obtained configuration data to configuration data stored in a memory of a corresponding server,
determine that the obtained configuration data is different from the configuration data stored in the memory of the corresponding server based on the comparison;
replace the configuration data stored in the memory with the obtained configuration data in response to determining that the obtained configuration data is different than the configuration data stored in the memory, and
collect data from the one of the plurality of data sources based on the obtained configuration data when the obtained configuration data is different than the configuration data stored in the memory;
a plurality of listeners stored in a computer readable storage medium and executable by a processor to receive the collected data from the plurality of collectors, identify the collected data, parse the collected data, convert the collected data into a generic format, and validate the converted data wherein the plurality of listeners are implemented using a script programming language; and
a loader stored in a computer readable storage medium and executable by a processor to load the converted data into a database, wherein the loader is implemented using an object oriented programming language, and wherein the object oriented programming language is JAVA.

12. The data collection system of claim 11, wherein each of the plurality of collectors is further executable to communicate with the central server periodically to obtain configuration data.

13. The data collection system of claim 11, wherein each of the plurality of collectors is further executable to:
maintain the configuration data stored in the memory when the obtained configuration data is identical to the configuration data stored in the memory; and
collect data from one of the plurality of data sources based on the configuration data stored in the memory when the obtained configuration data is identical to the configuration data stored in the memory.

14. The data collection system of claim 11 further comprising a plurality of loaders, wherein each of the plurality of loaders loads a data file with lines of a particular size thereby making each of the plurality of loaders more efficient.

15. The data collection system of claim 14, wherein each of the plurality of loaders is executed in a JAVA virtual machine.

16. The data collection system of claim 11, wherein the script programming language is Perl.

17. A method for collecting data, comprising:
changing configuration data stored on a central server;
obtaining, by a collector stored on a computer readable storage medium and executed by a processor, corresponding configuration data that includes the change to the configuration data from the central server;
comparing, by the collector, the corresponding configuration data to configuration data stored in the memory of a corresponding server;
determining, by the collector, that the corresponding configuration data differs from the configuration data stored in the memory based on the comparing;
implementing, by the collector, at least the change to the configuration data in response to determining that the corresponding configuration data differs from the configuration data stored in the memory;
collecting, by the collector, data from a data source based on at least the change to the configuration data; and
receiving, by at least one listener, the collected data from the collector, wherein the at least one listener is implemented using a script programming language, and wherein the script programming language is Perl; and
loading, by a loader, the collected data into a database, wherein the loader is implemented using an object oriented programming language.

18. The method of claim 17, wherein the change to the configuration data changes one or more of how the collector collects data, where the collector collects data from, what the collector collects from, how the collector processes collected data, and what data the collector collects.

* * * * *